June 11, 1957 H. SOHN 2,795,057
TARGET IMAGE PROJECTOR FOR GUNNERY TRAINERS
Filed May 9, 1952 5 Sheets-Sheet 1
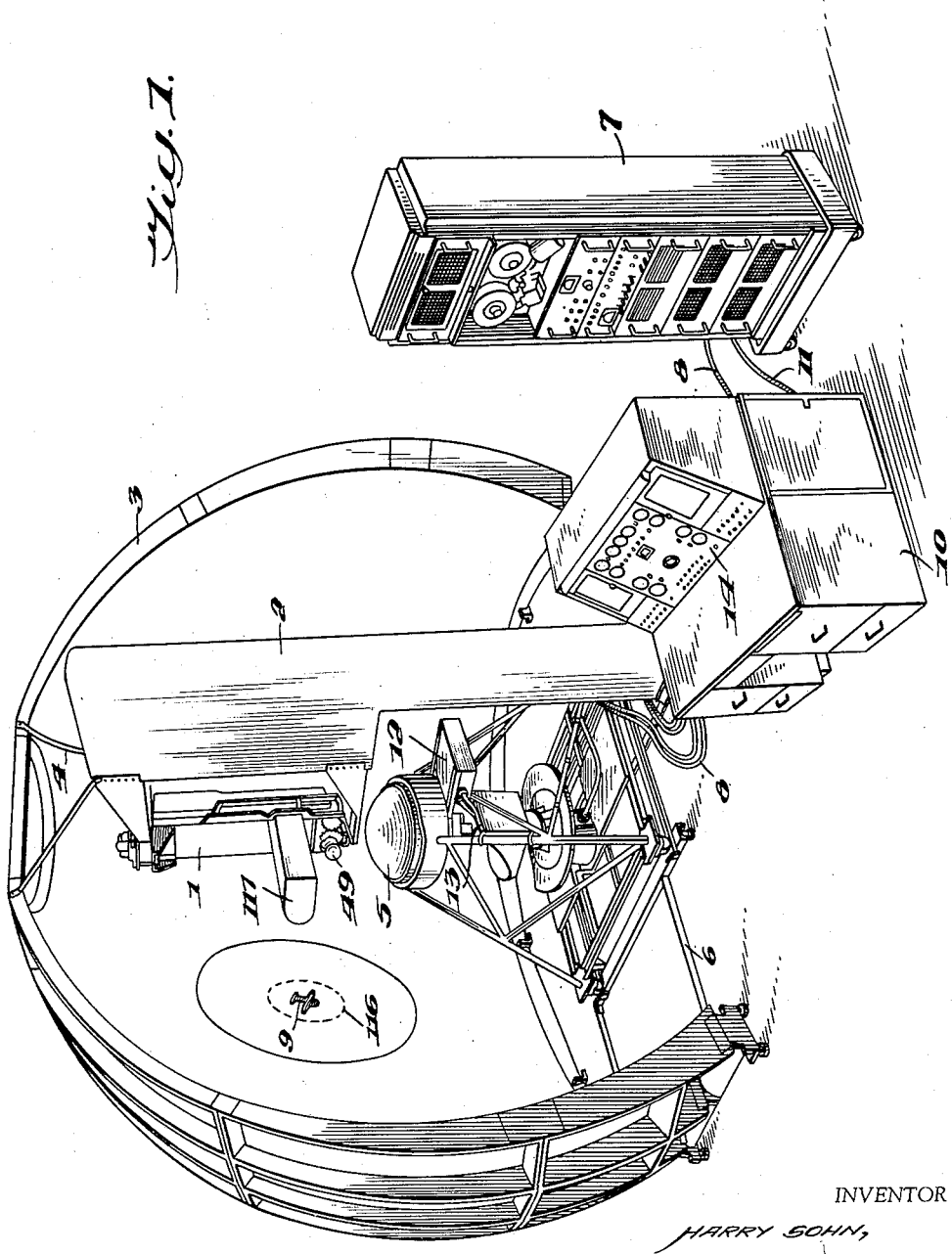
INVENTOR
HARRY SOHN,
BY
ATTORNEY

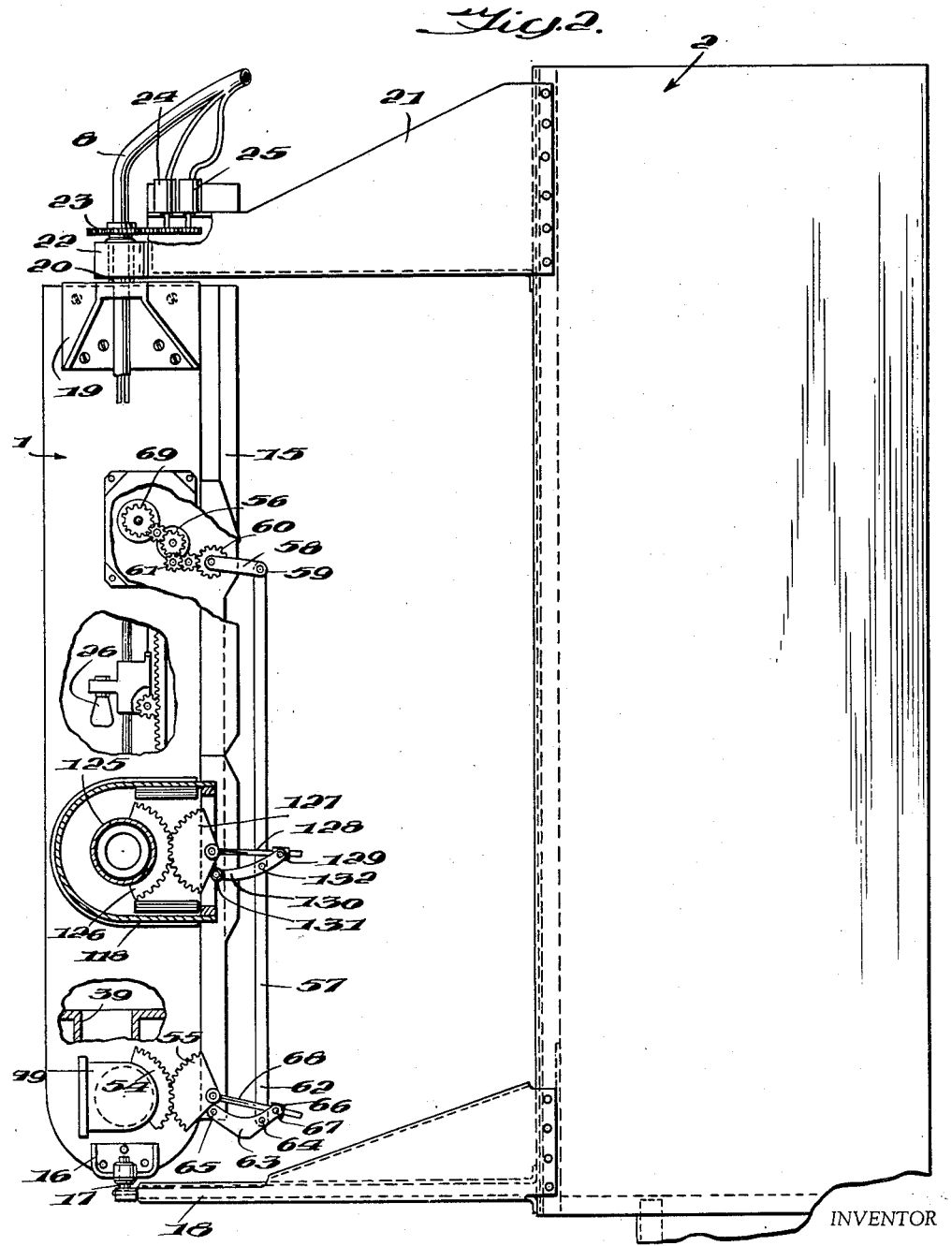

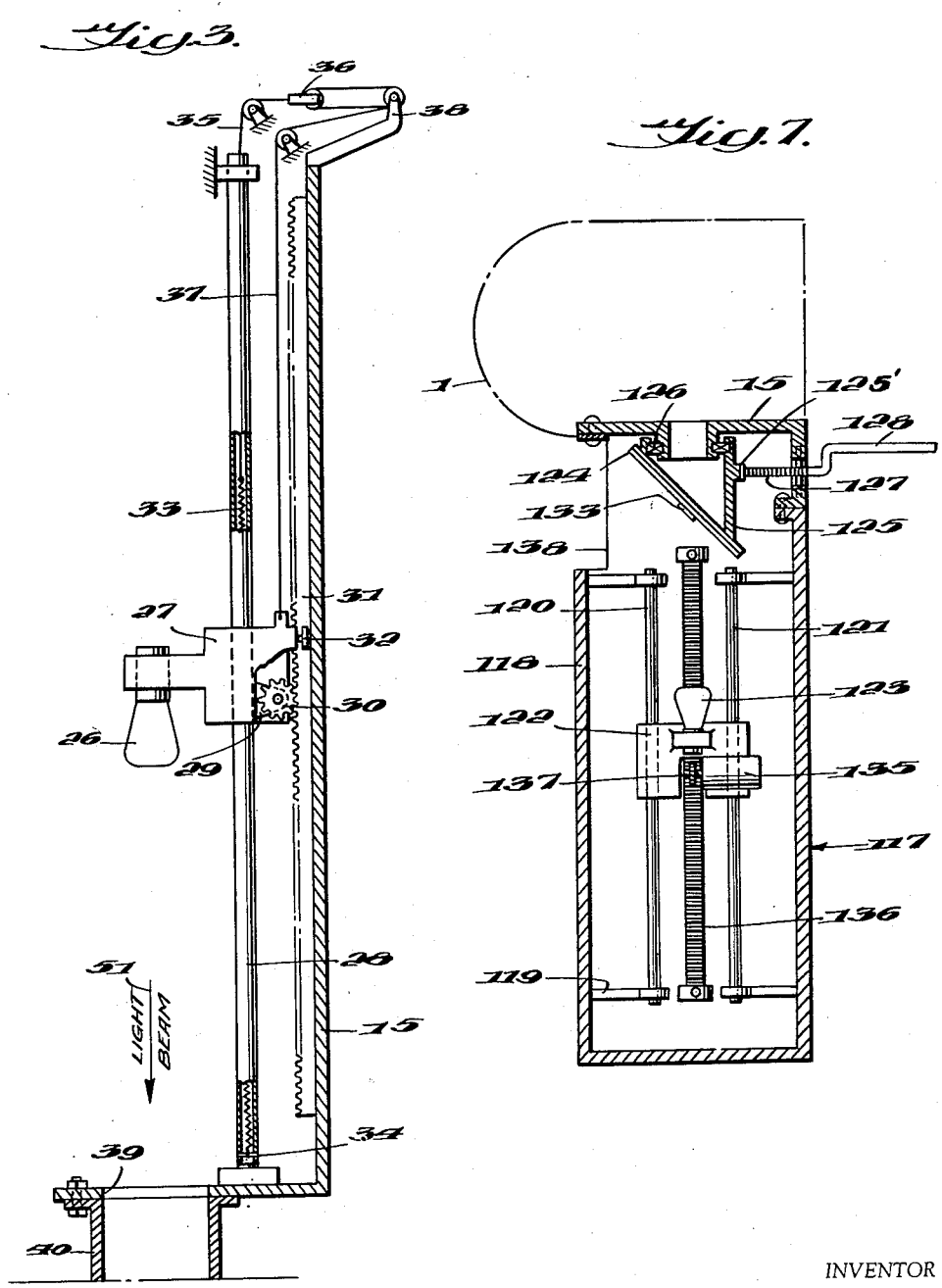

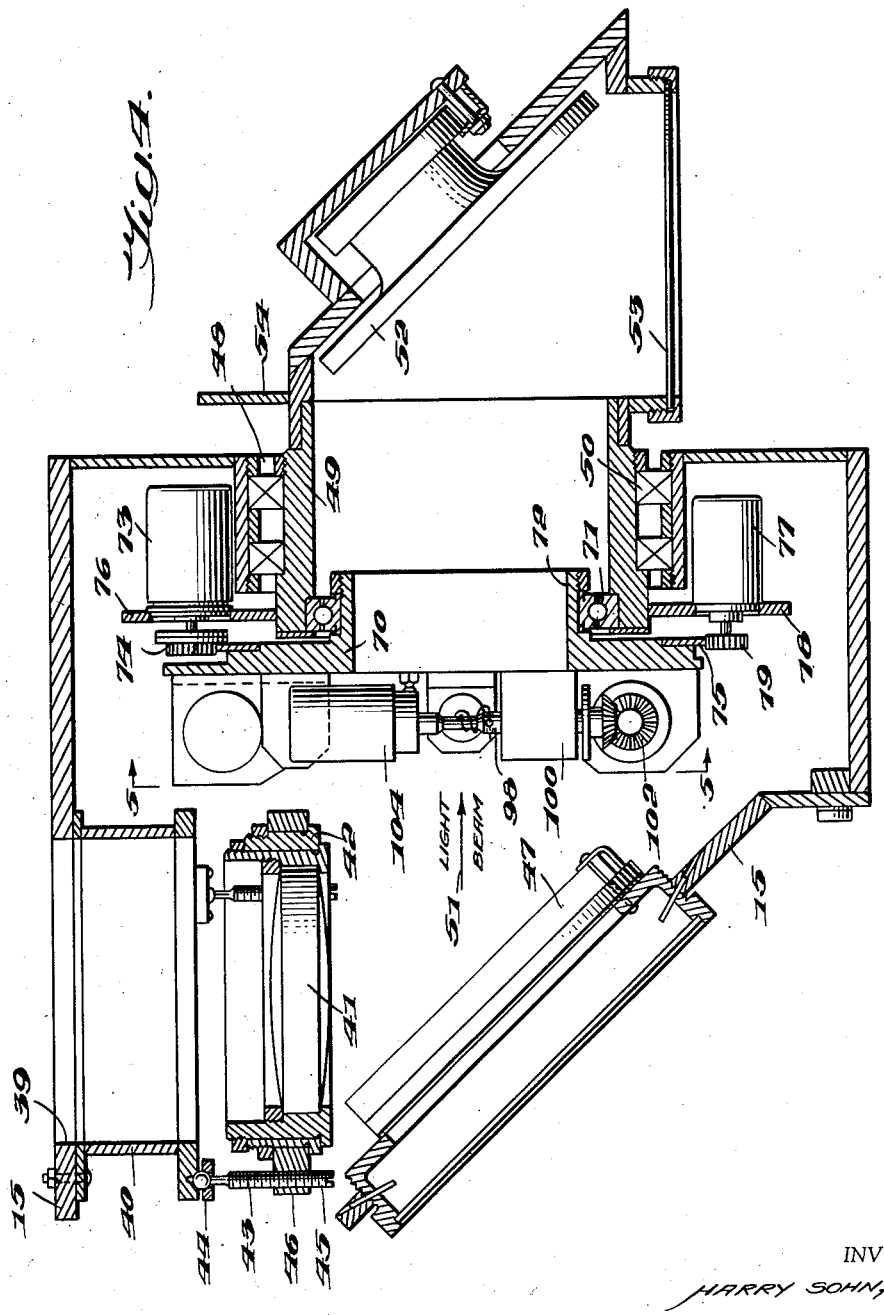

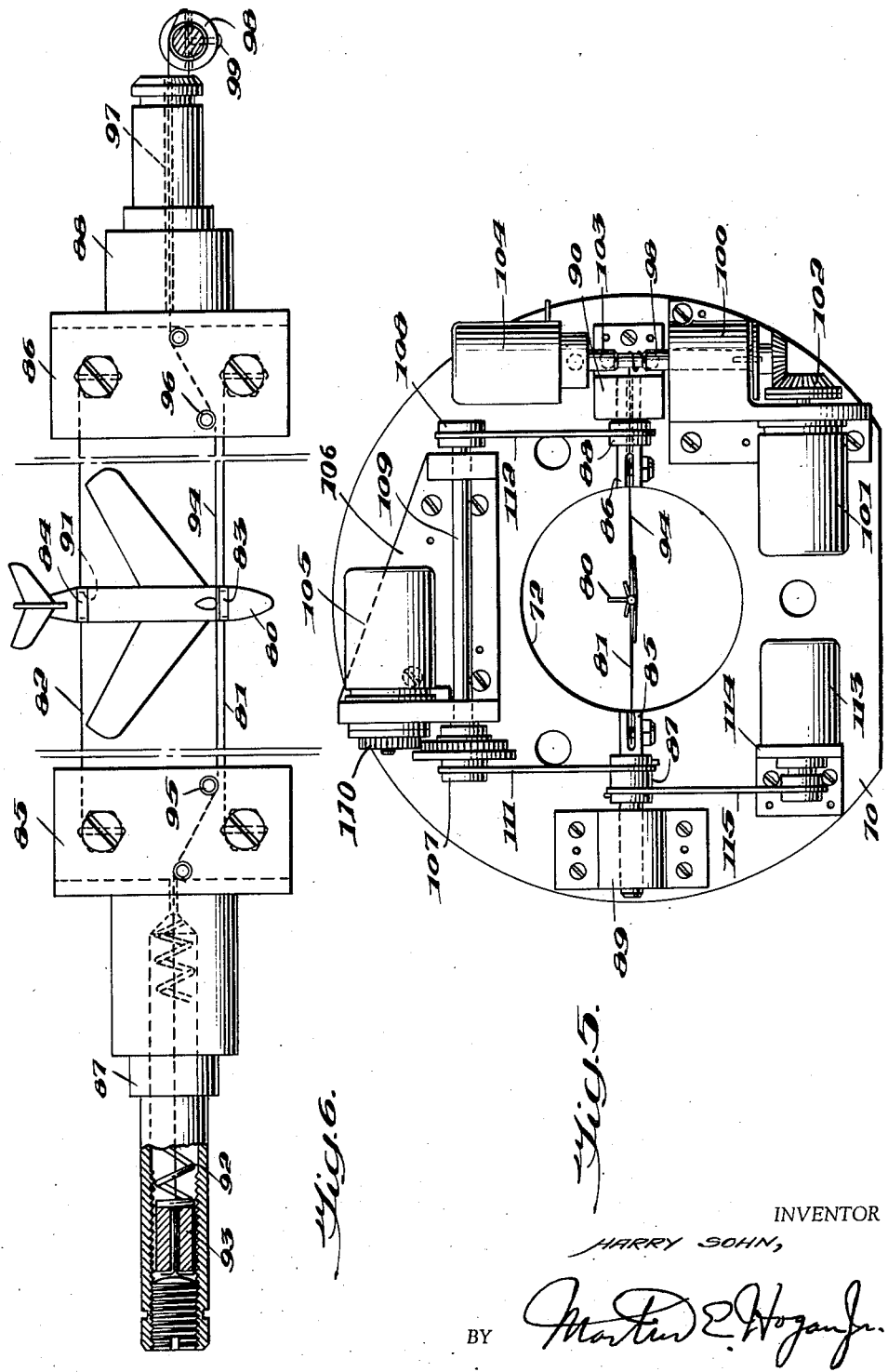

United States Patent Office 2,795,057
Patented June 11, 1957

2,795,057

TARGET IMAGE PROJECTOR FOR GUNNERY TRAINERS

Harry Sohn, Essex, Md., assignor to The Glenn L. Martin Company, Middle River, Md., a corporation of Maryland Application May 9, 1952, Serial No. 286,867

10 Claims. (Cl. 35—25)

This invention relates generally to gunnery trainers and more particularly to an image projector adapted to present a realistic shadow image on a spherical screen using a model of an actual fighter plane. The position, size and orientation of the image is varied with time by the projector to simulate an actual attack.

The trainer disclosed herein employs the actual fire control systems used in the aircraft to which the trainees will be assigned, thereby providing the same mechanical operations in the trainer as are required in the actual aircraft installation for tracking the target.

The projector used in combination with the actual aircraft fire control system provides a ground installation which simulates the conditions in actual flight. The target image appears as the real target would, moving in space according to a particular attack course. The trainee sights on the target in the same manner as he would were the fire control system in the actual aircraft. Training time in actual flight thus may be reduced to a minimum, permitting training a greater number of gunners with fewer aircraft and at a much lower cost.

In many respects training with the gunnery trainer described herein is superior to flight training, especially in determining the aptitude of the trainees and in evaluating training results. In the gunnery trainer the attack conditions may be identically reproduced as often as desired, thus providing a sound basis for comparing the relative abilities of the trainees.

An object of this invention is to provide an advanced gunnery trainer which will simulate the conditions in actual combat whereby a gunner may be thoroughly and efficiently trained with a minimum of flight instruction.

Another object of this invention is to provide an image projector which will present a realistic shadow image of a target in the proper position, size and orientation at any instant of time to simulate an actual attack.

Another object of this invention is to provide a projector having means for illuminating a large portion of the screen surrounding the target image without interfering with the image regardless of its size, position or orientation.

Further and other objects will become apparent from the accompanying description and drawings which form a part of this disclosure and in which like numerals refer to like parts.

In the drawing:

Fig. 1 is a perspective view showing the general arrangement of the gunnery trainer.

Fig. 2 is a fragmentary side view of the projector assembly.

Fig. 3 is a fragmentary sectional side view of the primary light source and its actuating mechanism.

Fig. 4 is a sectional side view of the projector model, lens and mirror housing.

Fig. 5 is a view of the model and its positioning mechanism taken on line 5—5 of Fig. 4.

Fig. 6 is a plan view of the model and its supporting means.

Fig. 7 is a sectional top view of the secondary light source and mirror arrangement.

The general arrangement of the components of the gunnery trainer is shown in Fig. 1. Projector assembly 1 is carried by post 2. A generally spherically shaped concave screen 3 arranged forwardly of projector assembly 1 is secured in a fixed position relative to post 2 by suitable brackets 4 so that any point on the screen will be substantially the same distance from the image projector as any other point on the screen. A sighting stand 5 is secured in position adjacent to and below projector assembly 1 by suitable brackets 6 so that a sighting line from the stand to any point on the screen may be made without obstruction from projector assembly 1 and post 2. Sighting stand 5 includes the identical gun directing system used on the particular aircraft for which the operator is being trained.

A course generator 7 is provided as a part of the gunnery trainer for generating control voltages which are fed into projector assembly 1 through cable 8 for positioning the target image 9 on the face of screen 3 as hereinafter described in detail. Course generator 7 is of the conventional type and employs magnetic tape on which the information needed to direct the target image through a typical combat attack course is stored. The control voltages going to projector assembly 1 are obtained in the course generator by amplifying the voltages picked up from the magnetic tape. An instructor's desk 10, forming a part of the gunnery trainer, houses a comparator which receives target image position data voltages from course generator 7 through cable 11, and sight position data voltages from a sight position pick-off unit 12 on sighting stand 5 through cable 13. The image position data and sight position data are compared in the comparator to determine the number of hits scored. A scoring unit also forming a part of desk 10 presents the hit score to the instructor as a dial reading on the face of the desk panel 14. Neither the details of the course generator nor of the instructor's desk form any part of the invention and these units are merely generally described to illustrate the utility and general field of application of my novel projector.

Projector assembly 1, incorporating the target image producing means, and drive mechanism for moving the image in elevation, is best shown in Fig. 2 and includes a projector frame 15 pivotally carried by post 2 for swinging movement about a vertical axis, the lower end 16 of projector frame 15 being trunnioned on a pin 17 carried by a bracket 18 secured to post 2. The upper end 19 of projector frame 15 includes a hollow shaft 20 which is rotatably carried within a collar 22 on a bracket 21 secured to post 2. Electrical cable 8 is fed through hollow shaft 20 for connecting the output from course generator 7 with the drive motors in the projector assembly.

Azimuth motion of the target image is effected by the swinging movement of projector assembly 1. To control this swinging movement of the projector so that the target image will move in azimuth according to a pre-selected attack course, a sector gear 23 is secured to the upper end of shaft 20 and is connected through suitable gearing to a drive motor 24. A follow-up potentiometer 25 is also geared to drive motor 24 in conventional fashion to complete a servo system for accurately positioning the target image in azimuth according to the output from course generator 7. Drive motor 24 and potentiometer 25 are suitably carried by bracket 21.

A primary light source 26, best shown in Fig. 3, is carried by projector frame 15 for projecting the target image onto screen 3. Light source 26 is a lamp of the type which generates its light energy from substantially a point source, a suitable lamp of this type being that known as the "Concentrated Arc Lamp" made by the Western Union Telegraph Co. In order to change the size of the target image to represent changes in target range, light source 26 is carried by a movable support 27. Support 27 slidably engages a hollow tube 28 secured at either end to projector frame 15. Tube 28 extends generally vertically and parallel with the axis of rotation of the projector assembly as is apparent from Fig. 2. Movement of light source 26 and support 27 along tube 28 is controlled by a reversible motor 29 driving a gear 30 which engages rack 31 secured to projector frame 15. Motor 29 is carried by support 27.

To stabilize light source support 27 on tube 28, guide rollers 32 are carried by support 27 on either side of rack 31 for engaging the side walls of the rack.

The weight of light source 26 and movable support 27 is counterbalanced to relieve the strain on motor 29 and allow it to drive the light source at the required velocities and accelerations. The counterbalancing arrangement includes a tension spring 33 carried within hollow tube 28. One end of spring 33 is held fixed by pin 34 at the lower end of tube 28. The opposite end of spring 33 is attached to a cord 35 which, as schematically shown in Fig. 3, connects with a pulley-block 36. Another cord 37 connects with light source support 27 and with pulley-block 36 through a second pulley-block 38 completing a block and tackle arrangement which permits light source 26 to be moved through a large distance while spring 33 is deflected only slightly. Pulley-block 38 is fixedly attached to projector frame 15 and pulley-block 36 is suspended by cords 35 and 37 for movement towards and away from pulley-block 38 as the light source is moved up and down on tube 28.

A generally circular opening 39 formed in projector frame 15, directly below light source 26 and in line with the light beam 51 from the source, admits the light beam into a straight tubular duct 40 secured to projector frame 15 as shown in Figs. 3 and 4. As best shown in Fig. 4, an optical lens 41, more accurately described as a cemented doublet well corrected for spherical and longitudinal chromatic aberrations, having a focal length substantially equal to the maximum distance between the lens and light source 26, is located over the lower end of duct 40 and in the path of the light beam from the source. Lens 41 is mounted in a suitable collar 42 suspended from tube 40 by studs 43 which are secured to tube 40 through clamping ring 44 so as to be universally and rotatably movable. The shank portions 45 of studs 43 threadedly engage a flange 46 on collar 42 so that by turning studs 43, lens 41 may be angularly adjusted to properly direct the light beam passing therethrough. Lens 41 permits obtaining the necessary change in target image size to represent changes in range by magnifying the longitudinal displacement of the light beam without requiring an unreasonable amount of movement of light source 26. With light source 26 at the focal point of lens 41, the light rays leave the lens parallel to one another. As the light source is moved closer to lens 41 the rays increasingly diverge.

A mirror 47 carried by projector frame 15 adjacent lens 41 and arranged at a 45° angle with respect to the lens, deflects the generally circular light beam through 90° immediately after passing through lens 41.

Projector frame 15 is provided at one side with a circular opening 48 adapted to receive a hollow tubular mirror housing 49 and permit rotational movement thereof relative to frame 15, through bearings 50, about an axis coincident with that of the light beam 51. A portion of mirror housing 49 protrudes beyond the normal contour of the projector assembly 1 as shown in Figs. 1 and 2 and supports a mirror 52 arranged at a 45° angle with light beam 51 as shown in Fig. 4 for deflecting the light beam 90° from its direction after striking mirror 47. Light beam 51 reflected off mirror 52 passes through a pane of glass 53 carried by housing 49 and on to screen 3 to produce the target image. The purpose of glass 53 is to prevent dust from entering the projector assembly. Mirror housing 49 is shown in Fig. 4 rotated 90° downwardly from its zero elevation position for purposes of clarity. A sector-like gear 54 is suitably secured, such as by welding, to the portion of mirror housing 49 which protrudes beyond the normal contour of the projector assembly as best shown in Fig. 2.

As shown in Fig. 2 elevation of the target image is controlled through sector gear 55 pivotally secured to projector assembly frame 15 so as to engage sector gear 54 on mirror housing 49. By rotating sector gear 55, mirror housing 49 is caused to rotate so as to move the target image in elevation. Rotation of sector gear 55 is positively controlled by elevation drive motor 56. To this end, a link 57 is pivotally connected at 59 to an arm 58, fixedly secured to gear 60 of a gear train 61, carried by projector frame 15 and driven by motor 56. The lower end 62 of link 57 pivotally connects with a lever 63 through pin 64. One end of lever 63 is pivotally carried at 65 by projector frame 15. A sleeve 66 is pivotally carried by lever 63 through pin 67 located adjacent pin 64. A rod 68 fixedly secured to sector gear 55 is slidably received within sleeve 66 so that movement of link 57, by operation of motor 56, causes rotational movement of the sector gear to control the elevational movement of the target image. A potentiometer 69, geared to motor 56, completes a conventional servo system for accurately positioning the target image at any selected elevation as determined by the elevation output from course generator 7.

A model mount 70 is rotatably carried between mirror 47 and mirror 52 by mirror housing 49 through suitable bearings 71 as best shown in Fig. 4. Model mount 70 is provided with a generally circular opening 72 of substantially the same diameter as light beam 51 for allowing the light beam to pass therethrough to mirror 52. Rotation of model mount 70 is controlled, for purposes hereinafter described, by motor 73 through gear 74 which engages a ring gear 75 on mount 70. Motor 73 is mounted on a bracket 76 secured to housing 49 so that rotational movement of the model mount due to operation of the motor is relative to the housing.

A potentiometer 77 carried by bracket 78 on housing 49 is driven by ring gear 75 through gear 79 to complete a servo system accurately controlling the actuation of motor 73 in accordance with an output from course generator 7.

A scale model 80 of the target is suspended from model mount 70 by means of wires 81 and 82, as best shown in Figs. 5 and 6, so as to be centered in opening 72 and in the path of light beam 51. Wires 81 and 82 connect with sleeve-like bands 83 and 84 on the fuselage of model 80 and with clevises 85 and 86 secured to shafts 87 and 88. As shown in Fig. 5, shafts 87 and 88 are rotatably carried by bearing brackets 89 and 90 secured to model mount 70, but are held against axial movement by the brackets so that wires 81 and 82 may be maintained taut. Bands 83 and 84, as shown in Fig. 6 are seated in grooves 91 formed in the fuselage of model 80 and allow free rotation of the model about its longitudinal axis.

As shown in Fig. 6, shaft 87 is drilled out to provide a generally cylindrical cavity therein for receiving a compression spring 92 and block 93. A roll control wire 94 connects with block 93 and extends axially through spring 92, over suitable guide rollers 95 in clevis 85 and on to model 80, where it is wrapped around the fuselage, thence over additional guide rollers 96 in clevis 86 and through a small aperture 97 extending axially through shaft 88 to roll shaft 98 where it is wrapped therearound and secured thereto by a setscrew 99. Roll shaft 98 is rotatably carried by bracket 100 for rotation about an axis normal to the axis of shafts 87 and 88. Spring 92 in shaft 87 keeps wire 94 taut as roll shaft 98 is rotated, thus allowing model 80 to be rolled in either direction about its longitudinal axis. Roll wire 94 and wires 81 and 82 are very small in diameter, being in the order of .003 of an inch, so that the projected image on screen 3 does not reveal their presence. A roll drive motor 101 carried by bracket 100 drives roll shaft 98 through gears 102. The end 103 of roll shaft 98 drivingly engages a potentiometer 104 which completes a conventional servo system for controlling the operation of roll motor 101.

Target model 80 is caused to pitch by rotating shafts 87 and 88. A pitch motor 105 is carried by bracket 106 secured to model mount 70 as shown in Fig. 5. Pitch motor 105 drives a pair of pulleys 107 and 108 carried on a shaft 109 through gears 110. Shaft 109 is suitably rotatably supported by bracket 106. Shafts 87 and 88 are caused to rotate together in accordance with the rotation of shaft 109 through belts 111 and 112. Pulley 107 drives shaft 87 through belt 111 and pulley 108 drives shaft 88 through belt 112. Thus by operation of motor 105, target model 80 may be moved in pitch independently of roll which is effected by operation of roll motor 101. A pitch potentiometer 113, carried by bracket 114 secured to model mount 70, is driven by belt 115 and completes a servo system responsive to an output from course generator 7 for controlling the operation of pitch motor 105.

Target model 80 is caused to yaw by simultaneously operating pitch motor 105 and roll motor 101 with motor 73, shown in Fig. 4, which rotates the entire assembly on model mount 70. For example to produce pure yaw, target model 80 is pitched downward as in a dive, then model mount 70 is rotated until the longitudinal axis of model 80 is in the horizontal plane and then the model is rolled about the longitudinal axis to bring it back to the zero roll position. By performing these operations simultaneously the only actual movement of the model is in yaw.

By operation of motors 73, 101 and 105, target model 80 may be moved in pitch, roll and yaw for simulating any actual flight maneuver. Target model 80 being located in the light beam from light source 26, the portion of the light beam striking the model is blacked out to produce a shadow image of the target model surrounded by the remainder of the light beam. This light beam with the portion thereof blacked out and representing the target image is projected onto screen 3 as shown in Fig. 1 by the area within dotted line 116.

Light beam 51, which produces the target image identified in Fig. 1 by the reference character 9, is only slightly larger than the target image, thus presenting a bull's-eye effect to the viewer which is undesirable. The background for the target image should be sufficiently large that when sighting on the target image the outer edge of the background light cannot be seen and used as a reference line. With a large background target image 9 appears to the trainee as an actual aircraft moving in space.

The additional background necessary for such a presentation is provided by a secondary light source assembly 117 forming a part of projector assembly 1 as shown in Fig. 7. Housing 118 of assembly 117, carried by projector frame 15, is provided with brackets 119 carrying a pair of tubular guides 120 and 121 longitudinally of the housing and spaced apart and parallel to each other. A secondary light source support 122 is carried by guides 120 and 121 for movement therealong. A secondary light source 123 providing a substantially point source of light is carried on support 122. A mirror 124, the plane of which makes a 45° angle with the light beam from the source 123, is supported by a cylindrically shaped bracket 125 rotatably carried by projector frame 15 through bearing 126 so that the axis of rotation is aligned with the light beam. Bracket 125 is provided with a projection 125' extending radially outwardly from the outer wall thereof and having gear teeth as shown in Figs. 2 and 7 which engage the teeth on a sector gear 127 pivotally carried by projector frame 15. A rod 128 secured to the sector gear is slidably received in a sleeve 129 pivotally carried by lever 130 as shown in Fig. 2. Lever 130 is pivotally connected at one end to projector frame 15 through pin 131 and connects with link 57 adjacent its opposite end through pin 132 so that elevation drive motor 56 will control the rotational movement of mirror bracket 125 simultaneously with the control of mirror housing 49. Thus mirror 124 and elevation mirror 52, shown in Fig. 4, move in synchronism. The secondary light beam from source 123 is aimed towards mirror 124 which reflects the light in a generally circular pattern through opening 138 in housing 118 so as to project it onto screen 3 concentrically with respect to the beam projected from the primary light source hereinbefore defined as the area within dotted line 116 as shown in Fig. 1. Mirror 124 moving in unison with mirror 52, causes the secondary light beam to remain substantially concentric about the primary light beam and move with it to all elevation positions on the screen.

To prevent the secondary light from interfering with the target image, mirror 124 includes a non-reflecting center portion 133 suitably provided for such as by a layer of dark paint of such size and shape that the secondary light beam projected onto screen 3 has a blacked-out area substantially the same size and shape as the primary light beam. Thus the secondary beam may be represented in Fig. 1 as the lighted area outside dotted line 116 while the primary beam containing target image 9 may be represented as the area inside dotted line 116.

As the target image size is varied by moving primary light source 26 relative to lens 41 to represent changes in target range, the secondary light beam must be correspondingly varied in size in order to prevent the secondary light beam from overlapping the target image. Therefore, secondary light source 123 is mounted for movement relative to mirror 124 as shown in Fig. 7. The light rays from source 123 being slightly diverging, by moving the source closer to mirror 124 the projected beam is reduced in size at screen 3 and by moving it away from mirror 124 the projected beam is enlarged at screen 3. To control the movement of light source 123 relative to mirror 124 in accordance with the movement of primary light source 126, a reversible motor 135 is mounted on support 122 for engaging a rack 136 through gear 137. Rack 136 is arranged parallel with guides 120 and 121 and is secured to the wall of housing 118. An output voltage from course generator 7 causes motor 135 to position secondary light source 123 relative to mirror 124 so as to maintain the proper size relationship between the two projected beams on screen 3.

The secondary light source assembly 117 being secured to the projector assembly as shown in Fig. 1, azimuth motion of the secondary light beam is effected by the same motion of the projector assembly which effects the azimuth motion of the primary light beam producing the target image.

In the operation of the gunnery trainer, the instructor selects a particular attack course recorded on the magnetic tape stored in course generator 7 by actuating a switch mounted on panel 14 of desk 10. This starts course generator 7 in operation, producing output voltages which are fed through electrical cable 8 connecting with the control motors in projector assembly 1. Light beam 51 from source 26 passes through lens 41 and is reflected off mirrors 47 and 52 and projected onto screen 3. The target model 80, suspended in the path of the light beam, blocks out a portion of the light to produce target image 9. The light coming from a substantially point source, produces a well defined image of the target model. In the attack, target range is represented by varying the size of target image 9 by moving light source 26 relative to lens 41. Maneuvering the target is represented by moving target model 80 relative to light beam 51 so that target image 9 will appear in the same perspective on screen 3 as would an actual aircraft performing the same maneuver. As the size of the projected beam from the primary light source changes to represent range, secondary light source 123 is caused to move relative to mirror 124, producing a corresponding change in size in the secondary light beam projected onto the screen surrounding the target image to prevent interference with the target image.

Azimuth and elevation movement of the target are effected by the azimuth drive motor 24 and elevation drive motor 56 which are actuated by output voltages from course generator 7 to move the display on screen 3 in azimuth and elevation throughout the attack.

During the attack when target image 9 appears as a moving target, the operator in sighting stand 5 performs the operations necessary for tracking the target. The position of the operator's gun-sight is measured by pick-offs in the sight position pick-off unit 12, the output of which is continuously fed to a comparator forming a part of desk 10 and which compares the position of the gun-sight with the position of target image 9 and automatically calculates the number of hits possible during the simulated attack.

It is to be understood that certain changes, alterations, modifications and substitutions can be made without departing from the spirit and scope of the appended claims.

I claim as my invention:

1. In a gunnery trainer having sighting means for tracking a target and a spherically concave screen, a projector assembly comprising, a supporting post spaced from said screen, a projector assembly frame carried by said post for rotational movement about an axis generally parallel with said post, motor means carried by said post and operatively connected to said frame for controlling the rotation thereof, means including a substantially point source of light carried by said frame for projecting a beam of light onto said screen, said source being movable relative to said frame for changing the size of the light beam at said screen, mounting means carried by said frame for rotation about the axis of said beam and having an opening through which said light beam may pass, a target model carried by said mounting means in the path of said light beam for producing a target image on said screen within said light beam which varies in size with said light beam to represent changes in target range, light deflecting means rotatably carried by said frame between said target model and said screen for moving said light beam in a direction generally normal to the direction of movement of said frame, motor means carried by said light deflecting means and engaging said mounting means for rotating said mounting means relative to said light deflecting means, motor means carried by said mounting means for moving said target model relative to said mounting means about a pair of perpendicularly related axes, one of which is normal to the rotational axis of said mounting means so that rotation of said mounting means simultaneously with movement of said target model about said perpendicularly related axes produces universal movement of said target model, motor means carried by said frame and operatively connected to said light deflecting means for controlling the rotation thereof, and means electrically connecting with said motor means and generating output voltages driving said motor means for moving said light beam and target image on said screen whereby to present a realistically moving target.

2. In a gunnery trainer including gun sighting means and a generally spherical screen, a projector for projecting a shadow image of a target on said screen to be aimed at by said sighting means comprising, a supporting post, a frame carried by said post for rotational movement relative thereto, means including a substantially point source of light carried by said frame for projecting a beam of light onto said screen, a target model carried by said frame between said light source and said screen for universal movement relative to said frame, means controlling the movement of said model whereby to produce a realistically appearing maneuvering target in the form of a shadow image within said beam of light from said light source on the face of said screen, means for moving said light source towards and away from said target for varying the size of the target image on said screen to simulate changes in range of said target, reflector means movably carried by said frame between said target model and said screen for shifting said beam in a direction generally normal to the rotational movement of said frame, means for moving said reflector means and said frame whereby to correspondingly move said target image in azimuth and elevation on said screen, a secondary light source carried by said frame and including a reflector adapted to project a light beam substantially concentrically about said target image providing a large illuminated area around said target representing the sky, said secondary light reflector having a non-reflecting center portion producing a shadow having substantially the same size and shape as the projection from said primary light source, said secondary light source being movable relative to said frame for varying the size of said light beam on said screen in accordance with changes in size of said target image, and means connecting with said projector for controlling the movement of said target image and said light beams so as to present a realistic and dynamic picture on said screen representing a typical enemy attack course.

3. A projector assembly for projecting a target image onto a screen comprising, a supporting post, a frame carried by said post for swinging movement relative thereto, light means producing a generally conical light beam from a substantially point source carried by said frame projecting a beam of light onto said screen, model mounting means carried by said frame and having an opening through which said light beam may pass, a target model carried by said mounting means in the path of said light beam for producing a shadow image on said screen within said light beam representing said target image, light deflecting means rotatably carried by said frame between said target model and said screen for moving said light beam in a direction generally normal to the direction of movement of said frame, motor means carried by said light deflecting means and engaging said model mounting means for rotating said mounting means relative to said light deflecting means, motor means carried by said model mounting means for moving said target model about a pair of angularly related axes relative to said model mounting means without said model being displaced laterally with respect to said beam, whereby rotation of said model mounting means simultaneously with movement of said target model about said angularly related axes produces universal movement of said target model, and means for rotating said frame and said light deflecting means for moving said target image to any position on said screen.

4. In a gunnery trainer including gun sighting means and a generally spherical screen, a projector for projecting a shadow image of a target on said screen comprising, a supporting post secured in a fixed position relative to said screen, a frame carried by said post for swinging movement relative thereto, means including a substantially point source of light carried by said frame for projecting a beam of light onto said screen, means carried by said frame for moving said light source so as to vary the size of said light beam at said screen, a target model carried by said frame and located in the path of said light beam for producing a target image on said screen within said light beam which varies in size with said light beam to represent changes in target range, a secondary light source carried by said frame, a reflector carried by said frame for projecting the light beam from said secondary light source concentrically about said first mentioned light beam providing a large illuminated area around said target representing the sky, said secondary light source reflector having a non-reflecting center portion producing a shadow having substantially the same size and shape as the light beam projection from said first mentioned light source, means carried by said frame for varying the size of said light beam from said secondary source in accordance with changes in size of the light beam from said first mentioned light source, and means carried by said frame for moving said first mentioned light beam and said secondary light beam in a direction generally normal to said swinging movement of said frame whereby said light beams may be moved to any position on said screen.

5. In a projector system, means for universally supporting a model comprising a housing forming a duct, a model mount rotatably carried by said housing transversely of said duct, said mount having a central opening formed therein, a pair of co-axially aligned shafts rotatably carried by said mount on either side of said opening, supporting means carried by said shafts for supporting a model in alignment with said opening for free rotational movement about an axis normal to the axes of said shafts, means carried by said mount and connecting with said model for controlling the free rotational movement thereof independently of the rotation of said shafts, and motor means operatively connecting with said model mount, said shafts, and said last mentioned means for controlling the movement thereof whereby to produce universal movement of said model.

6. A projector assembly for projecting a target image onto a screen comprising, a supporting post, a frame carried by said post for swinging movement relative thereto, light means carried by said frame for projecting a beam of light onto said screen, model mounting means carried by said frame and having an opening through which said light beam may pass, a target model carried by said mounting means in the path of said light beam for producing a shadow image on said screen within said light beam representing said target image, light deflecting means rotatably carried by said frame between said target model and said screen for moving said light beam in a direction generally normal to the direction of movement of said frame, motor means carried by said light deflecting means and engaging said model mounting means for rotating said mounting means relative to said light deflecting means, motor means carried by said model mounting means for moving said target model about a pair of angularly related axes relative to said model mounting means whereby rotation of said model mounting means simultaneously with movement of said target model about said angularly related axes produces universal movement of said target model, and means for rotating said frame and said light deflecting means for moving said target image to any position on said screen.

7. In a projector system, a model mount for universally supporting a model, said mount having an opening in which a model can be held, a pair of axially aligned rotatable members located on diametrically opposite sides of said opening, at least two thin wires extending between said rotatable members for supporting said model in said opening for free rotation about its roll axis, said rotatable members being rotatable in unison so as to move said model about its pitch axis, and means operatively connected with said model and said rotatable members for controlling the movements thereof to produce roll and pitch of said model.

8. A projector assembly for projecting a target image comprising, a frame, a substantially point source of light carried by said frame, model mounting means carried by said frame for supporting a model in the path of a beam of light from said point source, said model being rotatable about a plurality of axes without being displaced laterally with respect to said beam, means to alter the distance between said source of light and said model so that a shadow image will be projected which can be varied in size, and means to control the movement of said model about its axes and the distance between said source of light and said model whereby shadow images in various attitudes and sizes can be projected.

9. A projector assembly for projecting a target image comprising, a frame, a substantially point source of light carried by said frame, model mounting means carried by said frame and having an opening through which a beam of light from said source may pass, a pair of axially aligned rotatable members located on diametrically opposite sides of said opening, at least two thin wires extending between said rotatable members for supporting a model in the path of said beam of light for free rotation about its roll axis, said rotatable members being rotatable in unison so as to move said model about its pitch axis, said model being rotatable about said axes without lateral displacement of the model with respect to said beam, means to alter the distance between said source of light and said model so that a shadow image will be projected which can be varied in size, and means to control the movement of said model about its axes and the distance between said source of light and said model whereby shadow images in various attitudes and sizes can be projected.

10. A projector assembly for projecting a target image comprising, a frame, a substantially point source of light and rotatable model mounting means carried by said frame, said model mounting means having an opening on its axis of rotation through which a beam of light from said source may pass, a pair of axially aligned rotatable members located on diametrically opposite sides of said opening, at least two thin wires extending between said rotatable members for supporting a model in the path of said beam of light for free rotation about its roll axis, said rotatable members being rotatable in unison so as to move said model about its pitch axis, said model being rotatable about said axes without lateral displacement of the model with respect to said beam, means to alter the distance between said source of light and said model so that a shadow image will be projected which can be varied in size, and means to control the rotation of said model mounting means, the movement of said model about its axes, and the distance between said source of light and said model whereby shadow images in various attitudes and sizes can be projected.

References Cited in the file of this patent

UNITED STATES PATENTS

| | | |
|---|---|---|
| 2,335,257 | Binks | Nov. 30, 1943 |
| 2,381,757 | Jones | Aug. 7, 1945 |
| 2,387,153 | Johnson et al. | Oct. 16, 1945 |
| 2,401,975 | Simijian | June 11, 1946 |
| 2,420,316 | Hine | May 13, 1947 |
| 2,420,633 | Wittel et al. | May 13, 1947 |
| 2,536,718 | Brandon | Jan. 2, 1951 |
| 2,593,117 | Davenport | Apr. 15, 1952 |

FOREIGN PATENTS

| | | |
|---|---|---|
| 473,646 | France | Jan. 19, 1915 |
| 300,602 | Germany | Oct. 17, 1919 |
| 506,822 | Great Britain | 1939 |
| 556,069 | Great Britain | Sept. 20, 1943 |
| 586,870 | Great Britain | Apr. 3, 1947 |